(12) United States Patent
Surianarayanan et al.

(10) Patent No.: US 11,640,254 B2
(45) Date of Patent: May 2, 2023

(54) CONTROLLED IMBALANCE IN SUPER BLOCK ALLOCATION IN ZNS SSD

(71) Applicant: Western Digital Technologies, Inc., San Jose, CA (US)

(72) Inventors: Ravishankar Surianarayanan, Bangalore (IN); Matias Bjorling, Copenhagen (DK)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/412,153

(22) Filed: Aug. 25, 2021

(65) Prior Publication Data

US 2023/0076985 A1    Mar. 9, 2023

(51) Int. Cl.
*G06F 3/06* (2006.01)

(52) U.S. Cl.
CPC ............ *G06F 3/064* (2013.01); *G06F 3/0604* (2013.01); *G06F 3/0631* (2013.01); *G06F 3/0659* (2013.01); *G06F 3/0688* (2013.01)

(58) Field of Classification Search
CPC ...... G06F 3/064; G06F 3/0604; G06F 3/0631; G06F 3/0659; G06F 3/0688
See application file for complete search history.

(56) References Cited

U.S. PATENT DOCUMENTS

| | | | |
|---|---|---|---|
| 7,886,118 B2 | 2/2011 | Lyons et al. | |
| 8,239,614 B2 | 8/2012 | Asnaashari et al. | |
| 8,966,209 B2 | 2/2015 | Post et al. | |
| 9,239,785 B2 | 1/2016 | Post et al. | |
| 10,817,192 B2 | 10/2020 | Kim et al. | |
| 2004/0250014 A1 | 12/2004 | Sohn | |
| 2010/0228928 A1* | 9/2010 | Asnaashari | G06F 12/0246 711/170 |
| 2016/0147648 A1 | 5/2016 | Niu et al. | |
| 2017/0123666 A1 | 5/2017 | Sinclair et al. | |
| 2018/0018091 A1* | 1/2018 | Shin | G06F 12/0246 |
| 2018/0157427 A1* | 6/2018 | Hong | G06F 3/0679 |
| 2019/0205038 A1 | 7/2019 | Lee | |
| 2019/0272115 A1* | 9/2019 | Hu | G06F 12/0238 |

(Continued)

OTHER PUBLICATIONS

International Search Report and Written Opinion for International Application No. PCT/US2022/028219 dated Sep. 23, 2022.

*Primary Examiner* — Masud K Khan
(74) *Attorney, Agent, or Firm* — Patterson + Sheridan, LLP; Steven H. VerSteeg

(57) ABSTRACT

A data storage device includes a memory device and a controller coupled to the memory device. The memory device includes a plurality of super devices. The controller is configured to set a free space threshold value for amount of free space that each super device of the plurality of super devices can have, determine that at least one super device of the plurality of super devices is at or above the free space threshold, determine that cold zones are disposed in more than one super device of the plurality of super devices, move data from the cold zones to a first super device of the plurality of super devices wherein after moving the data, all super devices are below the free space threshold, and allocate all new super blocks among the plurality of super devices without allocating any new super blocks to the first super device.

17 Claims, 9 Drawing Sheets

(56) References Cited

U.S. PATENT DOCUMENTS

2019/0384704 A1   12/2019  Gorobets et al.
2020/0409837 A1   12/2020  Bradshaw et al.
2021/0064260 A1*  3/2021  Koo ...................... G06F 3/0679

* cited by examiner

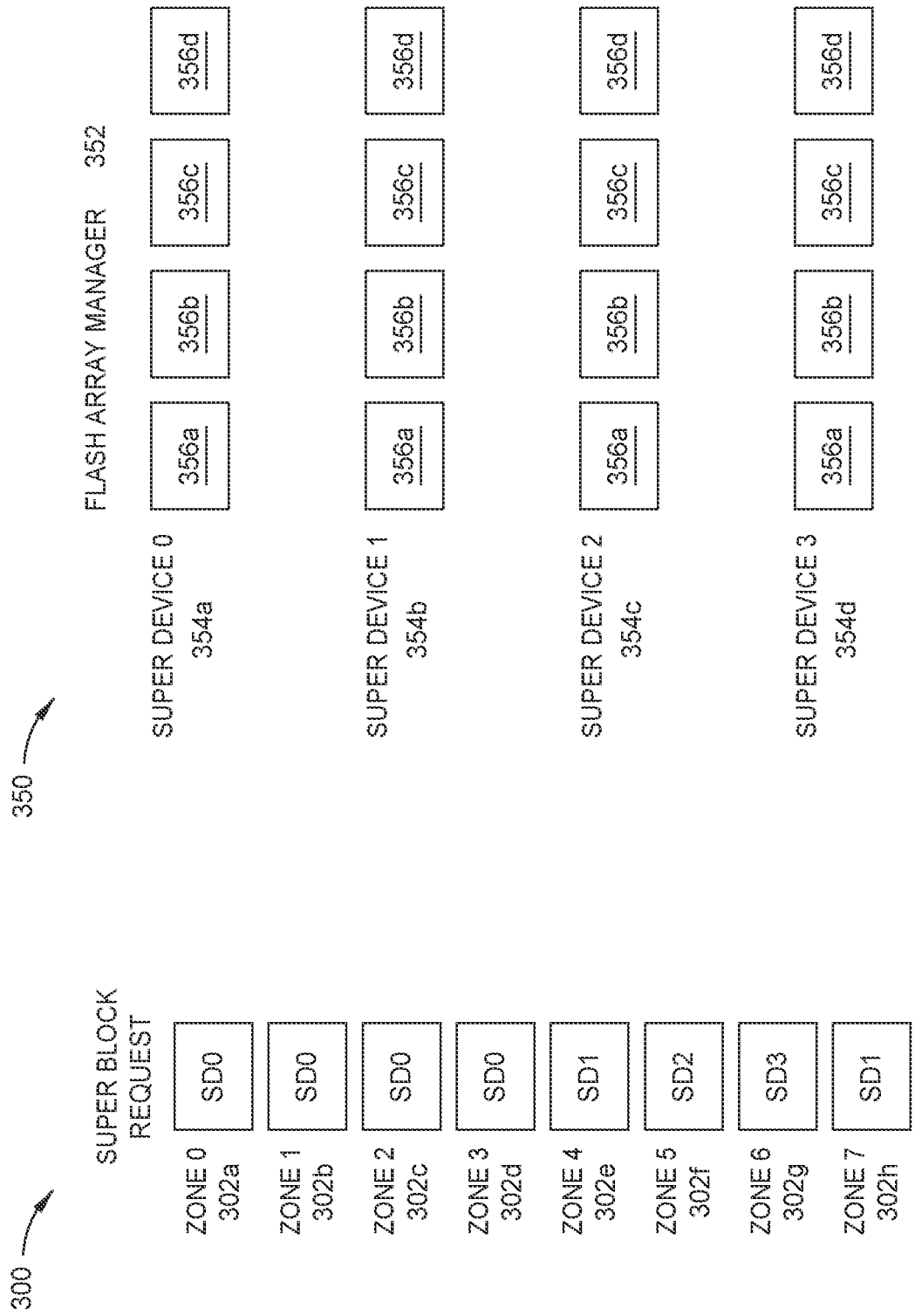

CONTROLLED IMBALANCE IN SUPER BLOCK ALLOCATION IN ZNS SSD

BACKGROUND OF THE DISCLOSURE

Field of the Disclosure

Embodiments of the present disclosure generally relate to data storage devices, such as solid state drives (SSDs), having zoned namespace (ZNS) architecture.

Description of the Related Art

ZNS SSDs are a class of SSDs that supports either sequential only zones or zone random write area (ZRWA). In a sequential only zones ZNS SSD, zone data is written sequentially without overwrites. However, in a ZRWA ZNS SSD, zones are written to randomly and with overwrites. Typically, ZNS SSDs supports sequential only zones. In order to overwrite a sequential zone, the zone must be reset before writing to the zone again. A zone reset is an un-mapping of all the data in the zone.

When a data storage device supports multiple active zones, each zone should be mapped to a superblock (i.e., a logical grouping of blocks across one or more dies of a memory device) belonging to a different super device in order to maximize write performance. For example, in a data storage device including 4 super devices and 4 active zones, each zone should be mapped to one superblock in each super device to maximize performance. Furthermore, zones should be reset before starting a write to the relevant zone. A zone that was previously residing in a super block in one super device may be allocated to another super block of another super device after resetting the zone. Thus, free space is increased in the one super device that the zone was previously residing in and free space is decreased in the other super device that the zone was allocated to. The de-allocation and re-allocation of zones to different SDs may cause an SD imbalance in the data storage device causing a degradation in write performance and write performance.

Thus, there is a need in the art for an improved super block allocation across super devices of a data storage device.

SUMMARY OF THE DISCLOSURE

The present disclosure generally relates to data storage devices, such as solid state drives (SSDs), having zones namespace (ZNS) architecture. A data storage device includes a memory device and a controller coupled to the memory device. The memory device includes a plurality of super devices. The controller is configured to set a free space threshold value for an amount of free space that each super device of the plurality of super devices can have, determine that at least one super device of the plurality of super devices is at or above the free space threshold, determine that cold zones are disposed in more than one super device of the plurality of super devices, move data from the cold zones to a first super device of the plurality of super devices, and allocate all new super blocks among the plurality of super devices without allocating any new super blocks to the first super device.

In one embodiment, a data storage device includes a memory device having a plurality of super devices and a controller coupled to the memory device. The controller is configured to set a free space threshold value for an amount of free space that each super device of the plurality of super devices can have, determine that at least one super device of the plurality of super devices is at or above the free space threshold, determine that cold zones are disposed in more than one super device of the plurality of super devices, move data from the cold zones to a first super device of the plurality of super devices, wherein after moving the data, all super devices are below the free space threshold, and allocate all new super blocks among the plurality of super devices without allocating any new super blocks to the first super device.

In another embodiment, a data storage device includes a memory device having a plurality of super devices and a controller coupled to the memory device. The controller is configured to relocate all data from all cold zones from the plurality of super devices into a first super device of the plurality of super devices, and allocate super blocks to super devices of the plurality of super devices based upon amount of available free space, wherein the super blocks are allocated round robin, and wherein the super blocks are not allocated to the first super device.

In another embodiment, a storage device includes memory means including a plurality of super devices and a controller coupled to the memory means. The controller is configured to determine that cold zones are dispersed across the plurality of super devices, consolidate data of the cold zones into a first super device of the plurality of super devices, determine that a second super device of the plurality of super devices is at or above a free space threshold, and evenly allocate super blocks to other super devices of the plurality of super devices, wherein the super blocks are not allocated to the first super device or the second super device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3A is an illustration of provisioning an active zone of a plurality of active zones to a super block of a plurality of super blocks of a super device of a plurality of super devices of FIG. 3B, according to certain embodiments.

FIG. 3B is an illustration of a mapping of a plurality of super blocks of a plurality of super devices by a flash array manager, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), having zones namespace (ZNS) architecture. A data storage device includes a memory device and a controller coupled to the memory device. The memory device includes a plurality of super devices. The controller is configured to set a free space threshold value for amount of free space that each super device of the plurality of super devices can have, determine that at least one super device of the plurality of super devices is at or above the free space threshold, determine that cold zones are disposed in more than one super device of the plurality of super devices, move data from the cold zones to a first super device of the plurality of super devices, and allocate all new super blocks among the plurality of super devices without allocating any new super blocks to the first super device.

Figure 1:
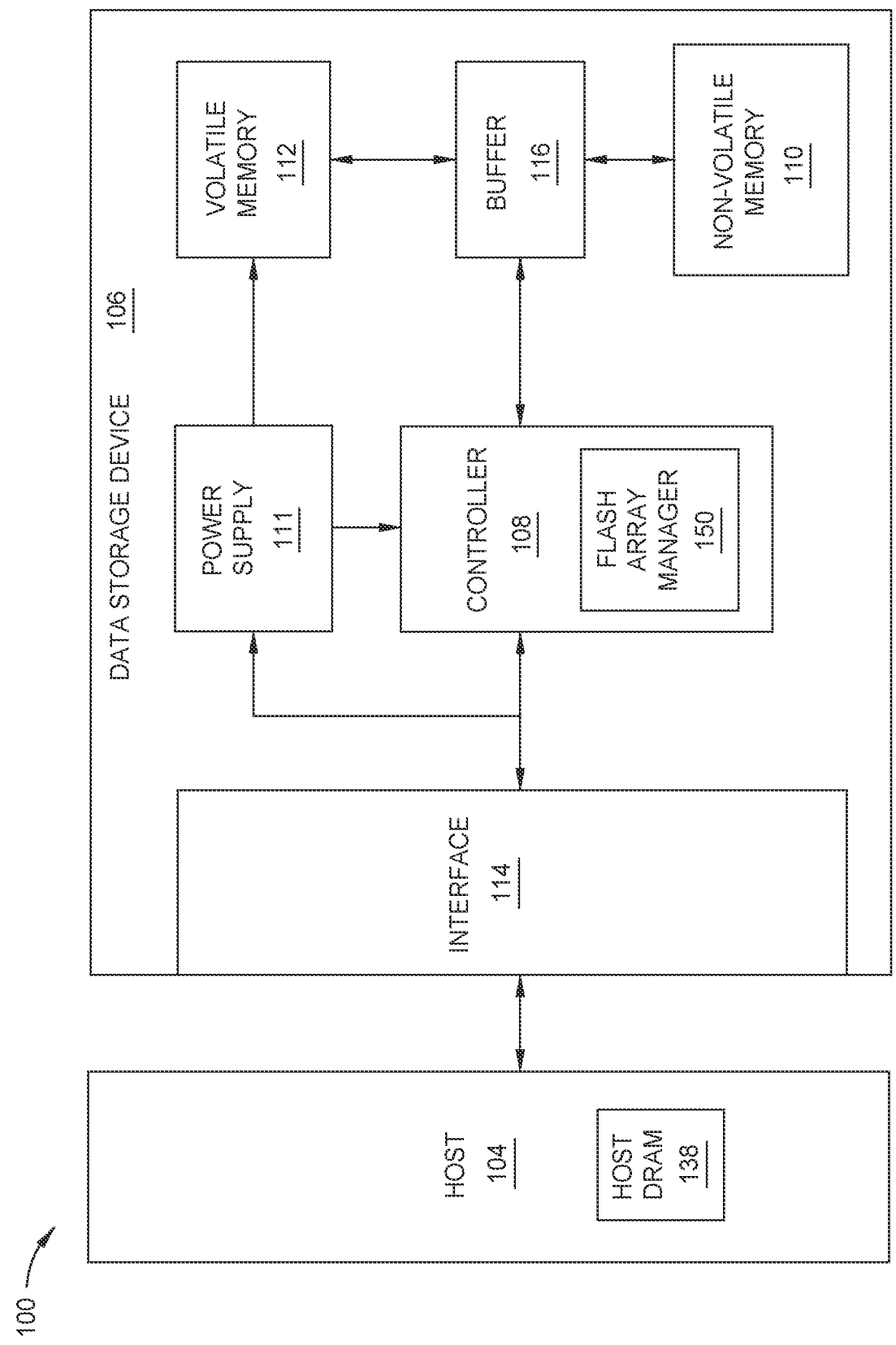
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store the at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Controller 108 includes a flash array manager (FAM) 150, where the FAM 150 is part of a flash translation layer (FTL). In some embodiments, the FTL may be coupled to the controller 108 and the FAM 150 is external to the controller 108 and is included in the FTL. FAM 150 is a module (e.g., component) that deals with bookkeeping and allocation of super blocks (SBs) to one or more super devices (SDs) of the NVM 110. AN SD is a sub-device of the NVM 110, where each SD includes a set of dies of the NVM 110. For example, if an SD has a capacity of about 32 dies, then an NVM including about 64 dies may include 2 SDs. Therefore, the data storage device 106 may include up to as many SDs as the capacity of the NVM 110 will allow. Likewise, a SB is a set of blocks of each die of an SD. FAM 150 further maintains a list of a free SBs across all SDs. When a zone, described in FIGS. 2A and 2B, requests a SB, the FAM 150 allocates a SB from a particular SD for the zone.

Figure 2A:
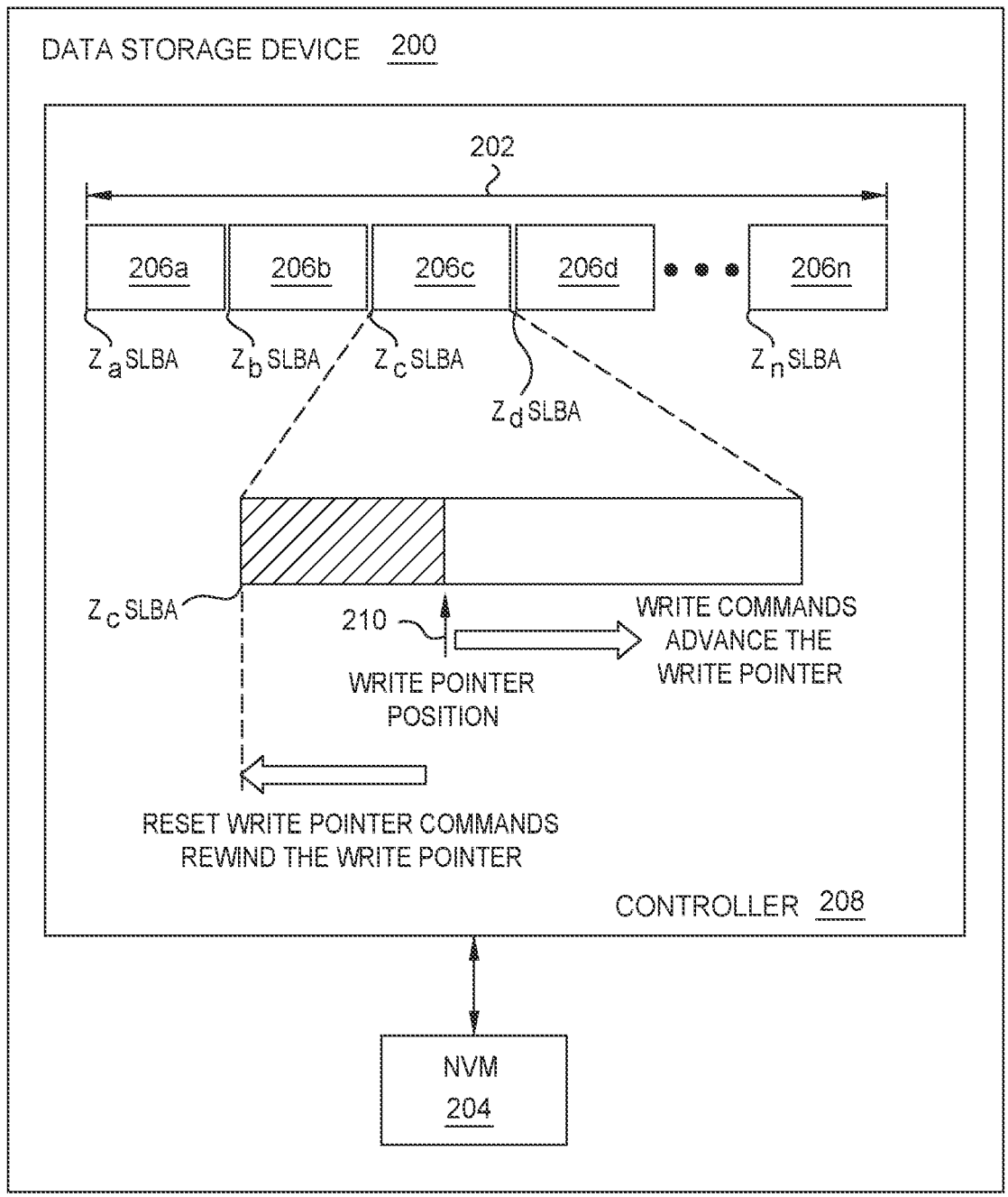
FIG. 2A is an illustration of a zoned namespace utilized in a storage device, according to certain embodiments.

FIG. 2A is an illustration of a Zoned Namespaces (ZNS) 202 view utilized in a data storage device 200, according to certain embodiments. The data storage device 200 may present the ZNS 202 view to a host device, such as the host device 104 of FIG. 1. The data storage device 200 may be the storage device 106 of the storage system 100 of FIG. 1. The data storage device 200 may have one or more ZNS 202, and each ZNS 202 may be different sizes. The data storage device 200 may further comprise one or more conventional namespaces in addition to the one or more Zoned Namespaces 202. Moreover, the ZNS 202 may be a zoned block command (ZBC) for SAS and/or a zoned-device ATA command set (ZAC) for SATA. Host side zone activity may be more directly related to media activity in zoned drives due to the relationship of logical to physical activity possible.

In the data storage device 200, the ZNS 202 is the quantity of NVM that can be formatted into logical blocks such that the capacity is divided into a plurality of zones 206a-206n (collectively referred to as zones 206). The NVM may be the storage unit or NVM 110 of FIG. 1. Each of the zones 206 comprise a plurality of physical or erase blocks (not shown) of a memory unit or NVM 204, and each of the erase blocks are associated a plurality of logical blocks (not shown). Each of the zones 206 may have a size aligned to the capacity of one or more erase blocks of a NVM or NAND device. When the controller 208 receives a command, such as from a host device (not shown) or the submission queue of a host device, the controller 208 can read data from and write data to the plurality of logical blocks associated with the plurality of erase blocks (EBs) of the ZNS 202. Each of the logical blocks is associated with a unique LBA or sector.

In one embodiment, the NVM 204 is a NAND device. The NAND device comprises one or more dies. Each of the one or more dies comprises one or more planes. Each of the one or more planes comprises one or more erase blocks. Each of the one or more erase blocks comprises one or more wordlines (e.g., 256 wordlines). Each of the one or more wordlines may be addressed in one or more pages. For example, an MLC NAND die may use upper page and lower page to reach the two bits in each cell of the full wordline (e.g., 16 KiB per page). Furthermore, each page can be accessed at a granularity equal to or smaller than the full page. A controller can frequently access NAND in user data granularity logical block address (LBA) sizes of 512 bytes. Thus, as referred to in the below description, NAND locations are equal to a granularity of 512 bytes. As such, an LBA size of 512 bytes and a page size of 16 KiB for two pages of an MLC NAND results in 32 LBAs per wordline. However, the NAND location size is not intended to be limiting, and is merely used as an example.

When data is written to an erase block, one or more logical blocks are correspondingly updated within a zone 206 to track where the data is located within the NVM 204. Data may be written to one zone 206 at a time until a zone 206 is full, or to multiple zones 206 such that multiple zones 206 may be partially full. Similarly, when writing data to a particular zone 206, data may be written to the plurality of erase blocks one block at a time, in sequential order of NAND locations, page-by-page, or wordline-by-wordline, until moving to an adjacent block (i.e., write to a first erase block until the first erase block is full before moving to the second erase block), or to multiple blocks at once, in sequential order of NAND locations, page-by-page, or wordline-by-wordline, to partially fill each block in a parallel fashion (i.e., writing the first NAND location or page of each erase block before writing to the second NAND location or page of each erase block). This sequential programming of every NAND location is a typical non-limiting requirement of many NAND EBs.

When a controller 208 selects the erase blocks that will store the data for each zone, the controller 208 will be able to choose the erase blocks either at the zone open time, or it may choose the erase blocks as it reaches a need to fill the first wordline of that particular erase block. This may be more differentiating when the above described method of filling one erase block completely prior to starting the next erase block is utilized. The controller 208 may use the time difference to select a more optimal erase block in a just-in-time basis. The decision of which erase block is allocated and assigned for each zone and its contiguous LBAs can be occurring for zero or more concurrent zones at all times within the controller 208.

Each of the zones 206 is associated with a zone starting logical block address (ZSLBA) or zone starting sector. The ZSLBA is the first available LBA in the zone 206. For example, the first zone 206a is associated with $Z_a$SLBA, the second zone 206b is associated with $Z_b$SLBA, the third zone 206c is associated with $Z_c$SLBA, the fourth zone 206d is associated with $Z_d$SLBA, and the $n^{th}$ zone 206n (i.e., the last zone) is associated with $Z_n$SLBA. Each zone 206 is identified by its ZSLBA, and is configured to receive sequential writes (i.e., writing data to the NVM 110 in the order the write commands are received).

As data is written to a zone 206, a write pointer 210 is advanced or updated to point to or to indicate the next available block in the zone 206 to write data to in order to track the next write starting point (i.e., the completion point of the prior write equals the starting point of a subsequent write). Thus, the write pointer 210 indicates where the subsequent write to the zone 206 will begin. Subsequent write commands are 'zone append' commands, where the data associated with the subsequent write command appends to the zone 206 at the location the write pointer 210 is indicating as the next starting point. An ordered list of LBAs within the zone 206 may be stored for write ordering. Each zone 206 may have its own write pointer 210. Thus, when a write command is received, a zone is identified by its ZSLBA, and the write pointer 210 determines where the write of the data begins within the identified zone.

Figure 2B:
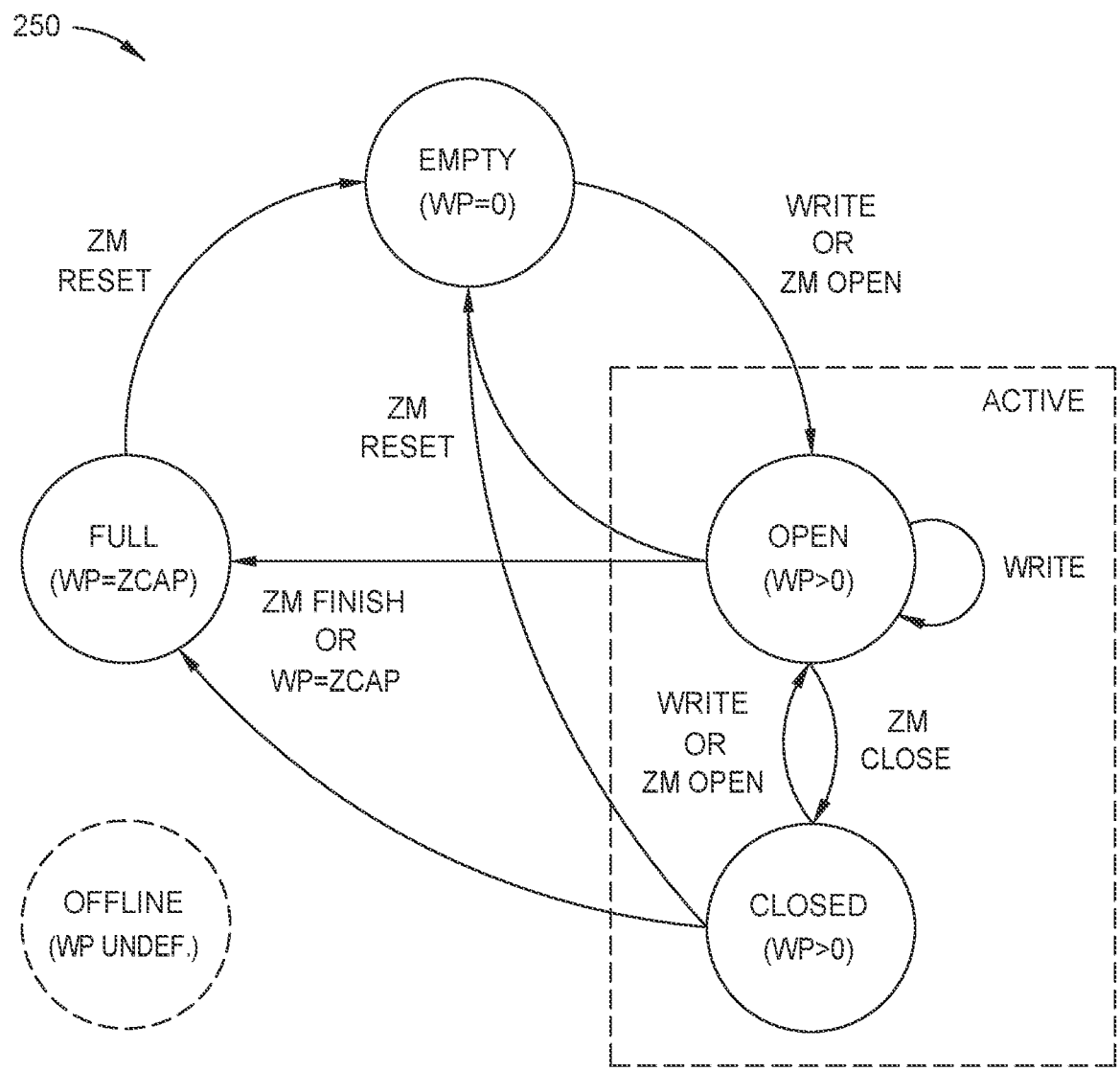
FIG. 2B is an illustration of a state diagram for the zoned namespaces of the storage device of FIG. 2A, according to certain embodiments.

FIG. 2B is an illustration of a state diagram 250 for the ZNS 202 of the data storage device 200 of FIG. 2A, according to certain embodiments. In the state diagram 250, each zone may be in a different state, such as empty, active, full, or offline. When a zone is empty, the zone is free of data (i.e., none of the erase blocks in the zone are currently storing data) and the write pointer is at the ZSLBA (i.e., WP=0). An empty zone switches to an open and active zone once a write is scheduled to the zone or if the zone open command is issued by the host. Zone management (ZM) commands can be used to move a zone between zone open and zone closed states, which are both active states. If a zone is active, the zone comprises open blocks that may be written to, and the host may be provided a description of recommended time in the active state. The controller 208 comprises the ZM. Zone metadata may be stored in the ZM and/or the controller 208.

The term "written to" includes programming user data on 0 or more NAND locations in an erase block and/or partially filled NAND locations in an erase block when user data has not filled all of the available NAND locations. The term "written to" may further include moving a zone to full due to internal drive handling needs (open block data retention concerns because the bits in error accumulate more quickly on open erase blocks), the data storage device 200 closing or filling a zone due to resource constraints, like too many open zones to track or discovered defect state, among others, or a host device closing the zone for concerns such as there being no more data to send the drive, computer shutdown, error handling on the host, limited host resources for tracking, among others.

The active zones may be either open or closed. An open zone is an empty or partially full zone that is ready to be written to and has resources currently allocated. The data received from the host device with a write command or zone append command may be programmed to an open erase block that is not currently filled with prior data. A closed zone is an empty or partially full zone that is not currently receiving writes from the host in an ongoing basis. The movement of a zone from an open state to a closed state allows the controller 208 to reallocate resources to other tasks. These tasks may include, but are not limited to, other zones that are open, other conventional non-zone regions, or other controller needs.

In both the open and closed zones, the write pointer is pointing to a place in the zone somewhere between the ZSLBA and the end of the last LBA of the zone (i.e., WP>0). Active zones may switch between the open and closed states per designation by the ZM, or if a write is scheduled to the zone. Additionally, the ZM may reset an active zone to clear or erase the data stored in the zone such that the zone switches back to an empty zone. Once an active zone is full, the zone switches to the full state. A full zone is one that is completely filled with data, and has no more available sectors or LBAs to write data to (i.e., WP=zone capacity (ZCAP)). In a full zone, the write pointer points to the end of the writeable capacity of the zone. Read commands of data stored in full zones may still be executed.

The zones may have any total capacity, such as 256 MiB or 512 MiB. However, a small portion of each zone may be inaccessible to write data to, but may still be read, such as a portion of each zone storing the parity data and one or more excluded erase blocks. For example, if the total capacity of a zone 206 is 512 MiB, the ZCAP may be 470 MiB, which is the capacity available to write data to, while 42 MiB are unavailable to write data. The writeable capacity (ZCAP) of a zone is equal to or less than the total zone storage capacity. The data storage device 200 may determine the ZCAP of each zone upon zone reset. For example, the controller 208 or the ZM may determine the ZCAP of each zone. The data storage device 200 may determine the ZCAP of a zone when the zone is reset.

The ZM may reset a full zone, scheduling an erasure of the data stored in the zone such that the zone switches back to an empty zone. When a full zone is reset, the zone may not be immediately cleared of data, though the zone may be marked as an empty zone ready to be written to. However, the reset zone must be erased prior to switching to an open and active zone. A zone may be erased any time between a ZM reset and a ZM open. Upon resetting a zone, the data storage device 200 may determine a new ZCAP of the reset zone and update the Writeable ZCAP attribute in the zone metadata. An offline zone is a zone that is unavailable to write data to. An offline zone may be in the full state, the empty state, or in a partially full state without being active.

Since resetting a zone clears or schedules an erasure of all data stored in the zone, the need for garbage collection of individual erase blocks is eliminated, improving the overall garbage collection process of the data storage device 200. The data storage device 200 may mark one or more erase blocks for erasure. When a new zone is going to be formed and the data storage device 200 anticipates a ZM open, the one or more erase blocks marked for erasure may then be erased. The data storage device 200 may further decide and create the physical backing of the zone upon erase of the erase blocks. Thus, once the new zone is opened and erase blocks are being selected to form the zone, the erase blocks will have been erased. Moreover, each time a zone is reset, a new order for the LBAs and the write pointer 210 for the zone 206 may be selected, enabling the zone 206 to be tolerant to receive commands out of sequential order. The write pointer 210 may optionally be turned off such that a command may be written to whatever starting LBA is indicated for the command.

Referring back to FIG. 2A, when the host device 104 sends a write command to write data to a zone 206, the controller 208 pulls-in the write command and identifies the write command as a write to a newly opened zone 206. The controller 208 selects a set of EBs to store the data associated with the write commands of the newly opened zone 206 to, and the newly opened zone 206 switches to an active zone 206. The write command may be a command to write new data, or a command to move valid data to another zone for garbage collection purposes. The controller 208 is configured to DMA read new commands from a submission queue populated by a host device.

In an empty zone 206 just switched to an active zone 206, the data is assigned to the zone 206 and the associated set of sequential LBAs of the zone 206 starting at the ZSLBA, as the write pointer 210 is indicating the logical block associated with the ZSLBA as the first available logical block. The data may be written to one or more erase blocks or NAND locations that have been allocated for the physical location of the zone 206. After the data associated with the write command has been written to the zone 206, a write pointer 210 is updated to point to the next LBA available for a host write (i.e., the completion point of the first write). The write data from this host write command is programmed sequentially into the next available NAND location in the erase block selected for physical backing of the zone.

For example, the controller 208 may receive a first write command to a third zone 206c, or a first zone append command. The host device 104 identifies sequentially which logical block of the zone 206 to write the data associated with the first command to. The data associated with the first command is then written to the first or next available LBA(s) in the third zone 206c as indicated by the write pointer 210, and the write pointer 210 is advanced or updated to point to the next available LBA available for a host write (i.e., WP>0). If the controller 208 receives a second write command to the third zone 206c, or a second zone append command, the data associated with the second write command is written to the next available LBA(s) in the third zone 206c identified by the write pointer 210. Once the data associated with the second command is written to the third zone 206c, the write pointer 210 once again advances or updates to point to the next available LBA available for a host write. Resetting the third zone 206c moves the write pointer 210 back to the $Z_s$SLBA (i.e., WP=0), and the third zone 206c switches to an empty zone.

In the description herein, the term "erase block" may be referred to as "block" for simplification purposes.

FIG. 3A is an illustration of provisioning an active zone of a plurality of active zones 302a-302h to a super block of a plurality of super blocks 356a-356d of a super device of a plurality of super devices 354a-354d of FIG. 3B, according to certain embodiments. FIG. 3B is an illustration of a mapping of the plurality of super blocks 356a-356d of the plurality of super devices 354a-354d by a FAM 352, according to certain embodiments. For exemplary purposes, FIGS. 3A and 3B are described collectively herein. FAM 352 may be the FAM 150 of FIG. 1. It is to be understood that the number of active zones, the number of SDs, and the number of SBs are not intended to be limiting, but to provide an example of a possible embodiment.

FAM 352 maintains a mapping of the plurality of SBs 356a-356d of each of the plurality of SDs 354a-354d. When a zone requests a SB, the FAM 352 allocates an SB of an SD for that zone. The FAM 352 may allocate each of the SDs of the plurality of SDs 354a-354d in a purposeful imbalanced fashion. The phrase "purposeful imbalanced fashion" may refer to actively or purposely allocating SDs unevenly. For example, a first zone 302a is associated with a first SD0 354a, a second zone 302b is associated with the first SD0 354a, a third zone 302c is associated with the first SD0 354a, a fourth zone 302d is associated with the first SD0 354a, a fifth zone 302e is associated with a second SD1 354b, a sixth zone 302f is associated with a third SD2 354c, a seventh zone 302g is associated with a fourth SD3 354d, and an eighth zone 302h is associated with the second SD1 354b.

The purposeful imbalanced allocation by the FAM 352 allocates SBs to a single SD, such as the first SD0 354a, until the free space of the SD is less than or equal to a free space threshold value. If the free space of an SD, such as the first SD0 354a, is less than or equal to the free space threshold value, then the FAM 352 may either allocate SBs in a round robin fashion to the remaining SDs or choose another SD to allocate SBs from in a purposeful imbalanced fashion. The following logical statement may describe the purposeful imbalanced allocation scheme by the FAM 352. It is to be understood that one or more SDs may be selected to have purposeful imbalanced allocation of SBs.

```
Init:
    next_super_device_index = 0
Handle SB Request:
    Loop: Iterate across SDs until SB is allocated:
        if(free space of next_super_device_index is above free space
        threshold value)
            Provide SB from SD next_super_device_index
            continue Loop
        else(free space of next_super_device_index is less than free
        space threshold value)
            if(free space is above free space threshold
            value in next_super_device_index)
                Provide SB from SD
                next_super_device_index
                    next_super_device_index++
                    if (next_super_device_index ==
                    MAX_SUPER_DEVICES)
                        next_super_device_index = 0
                exit Loop
            else(free space is less than free space threshold value, so
            skip this super device)
                next_super_device_index++
                if (next_super_device_index ==
                MAX_SUPER_DEVICES)
                    next_super_device_index = 0
                continue Loop
```

The purposeful imbalanced allocation by the FAM 352 is completed using a next_super_device_index parameter. If the current SD is at capacity, such that the amount of free space remaining is less than a free space threshold, the next SB is allocated from a next SD by incrementing the next_super_device_index parameter (e.g., increasing the next_super_device_index parameter by 1). In one example, the next_super_device_index parameter is set to the first SD0 354a. It is to be understood that the SD corresponding to the next_super_device_index=0 may be randomly selected from a predetermined group of SDs or from the plurality of SDs of the data storage device 106.

SDs may be removed from allocation based on the amount of free space remaining in the SD. For example, an SD may be removed from allocation consideration when the amount of free space is above the free space threshold value. The determination of whether the SD is below the free space threshold value may be completed prior to allocating a SB to a zone, after allocating a SB to a zone, during data storage device 106 idle time, as a background operation, and the like. In one example, the free space threshold value of the SD corresponding to the next_super_device_index parameter is evaluated when the next_super_device_index parameter is initialized.

If the free space of the SD corresponding to the next_super_device_index parameter is above the free space threshold value (i.e., the amount of free space is less than a threshold value), then the next_super_device_index parameter is set to the next available SD, such as the second SD1 354b, that is below the free space threshold value. The SD that is above the free space threshold value is removed from allocation consideration.

When the free space of the SD that was above the free space threshold value decreases below the free space threshold value, such as when one or more SBs of the SD is/are reset or erased, the SD is reintroduced for allocation consideration. When the free space of the SD corresponding to the next_super_device_index parameter is above the free space threshold value (i.e., has less free space than a threshold value), the FAM 352 may allocated the remaining SDs in a round robin fashion.

The round robin allocation by the FAM 352 is completed using the same next_super_device_index parameter. The next SB is allocated from the respective SD by the next_super_device_index parameter. The next_super_device parameter is incremented after each SB allocation. For example, the next_super_device_index parameter is set to the second SD1 354b. Before moving forward, the free space threshold value of the second SD1 354b is evaluated. If the free space of the second SD1 354b is above the free space threshold value (i.e., has less free space than a threshold value), the next_super_device_parameter is incremented so that an SB is allocated from the next selected SD. For example, after the first SB 356a of the second SD1 354b is allocated to the fifth zone 302e, the next_super_device_index parameter is incremented, such that the pointer points to the first SB 356a of the third SD 354c.

When the next_super_device_index parameter reaches a MAX_SUPER_DEVICES parameter, the next_super_device_index parameter is reset to the first SD for round robin allocation (e.g., the second SD1 354b). In some examples, the next_super_device_index parameter may be reset to the selected SD for purposeful imbalanced allocation. The MAX_SUPER_DEVICES parameter is the maximum number of SDs mapped by the FAM 352 or the maximum number of SDs of the NVM 110.

When the free space threshold value of the SD corresponding to the next_super_device_index parameter is evaluated, the free space may be above the free space threshold value (i.e., has less free space than a threshold value). In this example, the next_super_device_index is incremented without an SB allocation to the SD, effectively skipping (e.g., removing from allocation consideration) the SD of the previous next_super_device_index parameter to continue the loop. When the next_super_device_index parameter reaches a MAX_SUPER_DEVICES parameter, the next_super_device_index parameter is reset to 0. Referring to FIG. 3B, the MAX_SUPER_DEVICES parameter is equal to 4. The following set of logical statements describes the allocation of SDs to each of the active zones. In some embodiments, the movement of SBs from one SD to another SD may occur as a background operation of the data storage device or in data storage device idle time.

Figure 4:
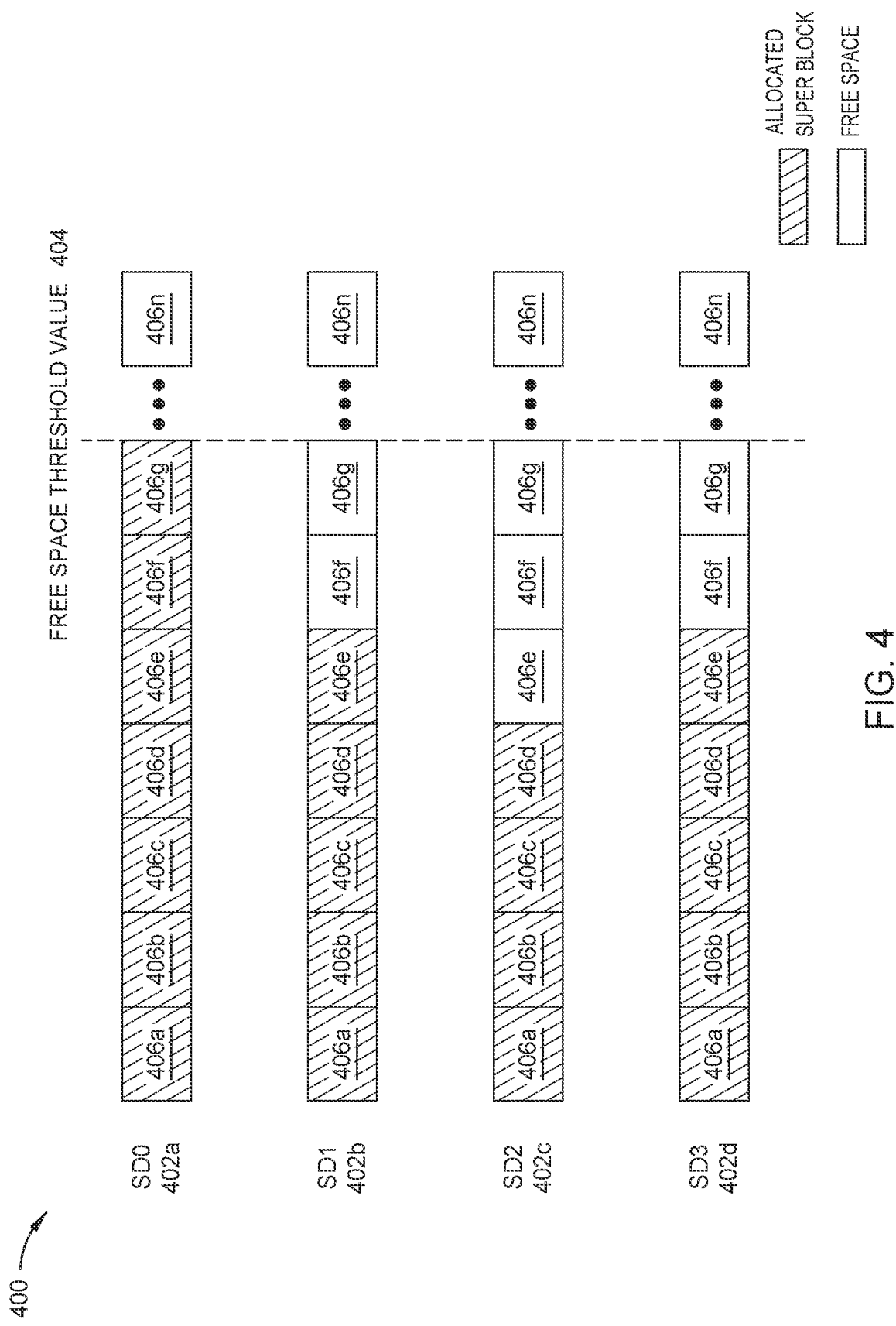
FIG. 4 is an illustration of a plurality of super devices, each having a plurality of super blocks, according to certain embodiments.

FIG. 4 is an illustration of a plurality of super devices 402a-402d, each having a plurality of super blocks 406a-406n, according to certain embodiments. It is to be understood that the depicted number of SBs and the number of SDs are not intended to be limiting, but to provide an example of a possible embodiment. Rather, the number of SBs and the number of SDs may be dependent on the capacity of the relevant memory device, such as the NVM 110 of FIG. 1. Each of the SBs of the plurality of SBs 406a-406n may be sized such that each SB is equal to the size of a zone. Thus, SB and zone may be utilized interchangeably herein, for exemplary purposes.

SBs or zones of the plurality of SDs 402a-402d that include data are denoted as an allocated super block. Otherwise, SBs or zones of the plurality of SDs 402a-402d that do not include data are denoted as free space. The plurality of zones 406a-406n that include data (e.g., an open and active zone) may be classified as either a cold zone or a hot zone. The classification or designation as a cold zone or a hot zone may be based on a number of overwrites (i.e., requiring a reset) or a number of resets of a zone (i.e., reset count). Hot zones are zones that are overwritten more frequently and cold zones are zones that are less frequently overwritten. If a SB includes more than 1 zone, the SB may include only cold zones, only hot zones, or both cold zones and hot zones. In one example, the following logical statement may describe a classification of the zones of the data storage device 106 by a controller, such as the controller 108 of FIG. 1.

```
zone_reset_count[MAX_NUMBER_ZONES];
if(zone_reset_count[zone] > zone_reset_threshold)
    zone_state = hot zone
else
    zone_state = cold zone
```

The zone_reset_threshold is a threshold reset value that may be based on a static value, such as value preset during data storage device 106 initiation, or a dynamic value, such as a value based on a moving average of resets per zone. When the number of resets for a zone is greater than the zone_reset_threshold, the controller 108 classifies the zone as a hot zone. However, when the number of resets for a zone is less than the zone_reset_threshold, the controller 108 classifies the zone as a cold zone.

During one embodiment of the operation of the data storage device 106, the controller 108 may move data of a cold zone from one SD to another SD in order to substantially evenly distribute cold zones across the plurality of SDs. In another embodiment of the operation of the data storage device 106, the controller 108 may move data of a cold zone from one SD to another SD that has the greatest amount of free space. In yet another embodiment of the operation of the data storage device 106, the controller 108 may move data of a cold zone from one SD to another SD in a round robin fashion. In another embodiment of the operation of the data storage device 106, the controller 1-8 may move data of a cold zone from one SD to another SD randomly. When the data of a cold zone is moved from one location to another, the zone count (i.e., the number of resets for the zone) is migrated with the data. By moving the data of a cold zone to another zone of a different SD, the cold zone is effectively moved. After moving the data of a cold zone to a different location, the cold zone of the original location is reset so that the zone is free space or may be programmed with new data (e.g., new host data or data moved from a different location).

Furthermore, each of the plurality of SDs 402a-402d has a free space threshold value 404. Although the free space threshold value 404 is shown to be the same for each of the plurality of SDs 402a-402d, the free space threshold value 404 may be SD specific, such that each SD has a different free space threshold value 404. The free space threshold value 404 represents a maximum amount of data or zones that may be programmed to an SD, such that a minimum amount of free space is maintained. For example, if a capacity of the SD is about 256 GB and the free space threshold value 404 is about 202 GB, then the minimum amount of free space to be maintained is about 54 GB.

SBs that may be written to are considered as write active, where a controller, such as the controller 108 of FIG. 1, can schedule write commands and program data to those SBs. When the free space threshold value 404 is reached or exceeded for an SD, a FAM, such as the FAM 352 of FIG. 3B, stops allocating the SD for an active zone request. Rather, the SD is skipped or removed from allocation consideration. Thus, SBs are allocated from the next eligible SD. For example, the first SD0 402a is at the free space threshold value 404 and a fourth SD3 402d is the last allocated SD. Thus, when an active zone requests a SB to be allocated for the active zone, the FAM 352 skips the first SD0 402a and allocates a SB from the second SD1 402b or, in another example, a SB from the next SD that is not removed from allocation consideration. The following logical statement may describe the allocation of SBs upon receiving an allocation request.

```
Init:
    next_super_device_index = 0
Handle SB Request:
    Loop: Iterate across SDs until SB is allocated:
        If free space is above critical threshold in
        next_super_device_index
            Provide SB from SD next_super_device_index
            next_super_device_index++
            if(next_super_device_index == MAX_SUPER_DEVICES)
                next_super_device_index = 0
            exit Loop
        else(free space is less, so skip next_super_device_index)
            next_super_device_index++
            if(next_super_device_index == MAX_SUPER_DEVICES)
                next_super_device_index = 0
            continue Loop
```

During the lifespan of a data storage device, such as the data storage device 106 of FIG. 1, the zones or SBs may be reset by a zone reset command. When a zone or SB is reset, the data of the zone or SB is unmapped. In one example, when a zone or SB that includes valid data is reset, the data may be temporarily stored in a volatile memory or cache and programmed to a different zone or SB or the same zone or SB after resetting the zone or SB. Thus, when the free space of an SD improves (e.g., increases) due to a zone reset or another operation, such as garbage collection, and the SD is below the free space threshold value 404, the SD that was removed from allocation consideration is introduced back into the allocation consideration. Furthermore, data of one SB or zone may be moved to another SB or zone to ensure even wear distribution. In some cases, the data of one SB or zone may be moved from one SD to another SB or zone of another SD.

Figure 5:
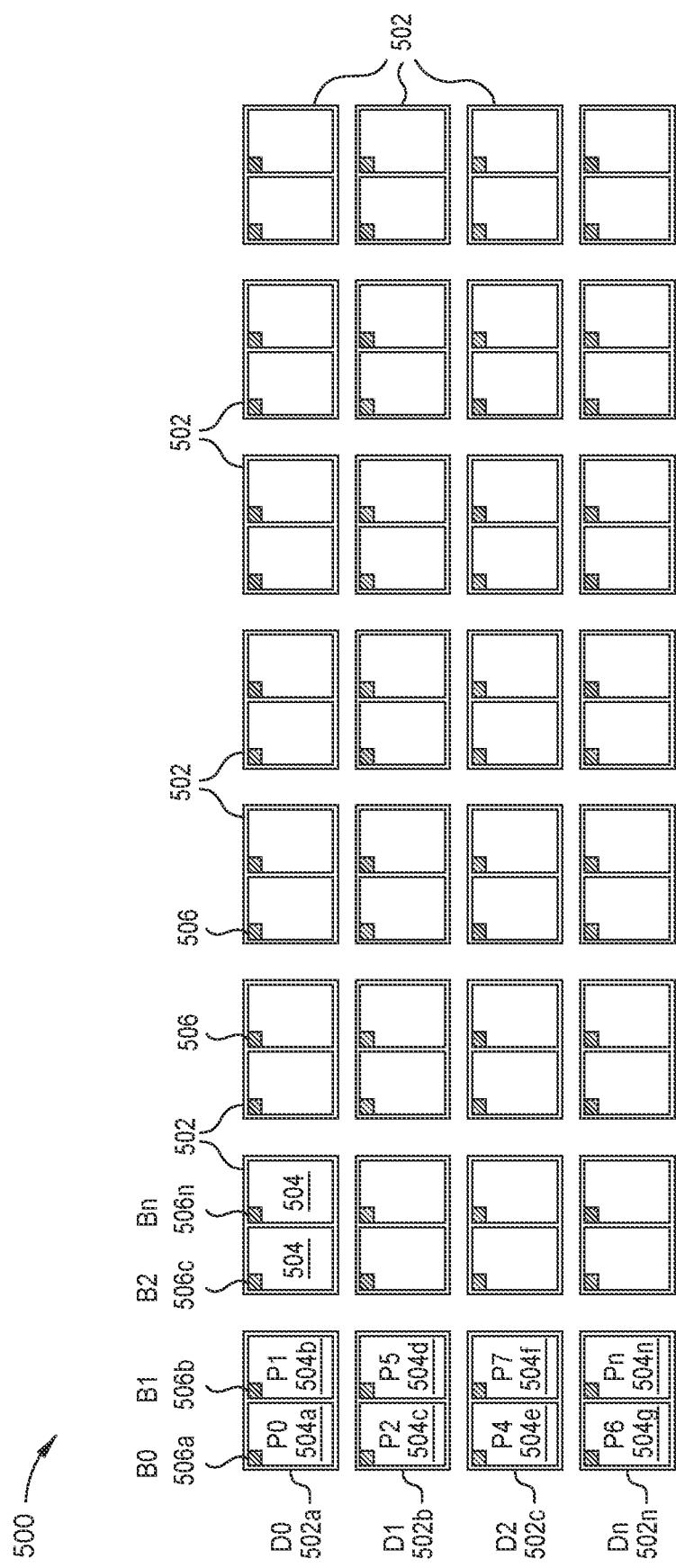
FIG. 5 is an illustration of a super device, according to certain embodiments.

FIG. 5 is an illustration of a super device 500, according to certain embodiments. The super device 500 includes a plurality of dies 502a-502n, collectively referred to as dies 502, where each die of the plurality of dies 502a-502n includes a first plane 504a and a second plane 504b, collectively referred to as planes 504. Each of the planes 504 includes a plurality of blocks 506a-506n, collectively referred to as block 506. While 32 dies 502 are shown in the SD 500, any number of dies may be included.

A super block, such as the first SB 356a of FIG. 3B, includes a block 506 from each plane 504 of each die 502. In some examples, a super block may include one or more blocks 506 from each plane 504 of each die 502. Furthermore, in some embodiments, one or more dies 502 of the super device 500 may be provisioned for storing XOR or parity data. In the description herein, a SB and a zone have the same capacity and may be referred to interchangeably, for exemplary purposes.

Furthermore, data is written sequentially from block to block in a first zone so that data is written to B0 506a before data is written to B1 506b. Data is also written sequentially from zone to zone so that data is written from a first zone before data is written to a second zone. A zone may have any writeable capacity (ZCAP), such as 256 MiB or 512 MiB, as discussed above. Each zone of a plurality of zones may have the same zone capacity. Data is erased in the zone capacity size when a data storage device, such as the data storage device 106 of FIG. 1, receives a zone reset request (or in some cases, generates a zone reset request as part of a data management operation, such as garbage collection). In other words, individual blocks cannot be erased unless an entire zone is erased or moved to the Zone Empty state (i.e., zone empty), as described in FIG. 2B. However, if the data storage device 106 comprises a non-volatile memory that has partial capability of ZNS, data is erased from the data storage device 106 in the zone capacity size in the portion of the non-volatile memory that has ZNS capability. Data may be erased from a non-ZNS capable non-volatile storage unit in a block size.

Furthermore, the location of the data stored in a ZNS-enabled portion of the NVM, such as the NVM 110 of FIG. 1, is recorded in a first logical to physical (L2P) table as LBAs in a volatile memory unit, such as the volatile memory unit 112. The location of the data stored in a non-ZNS-enabled portion of the NVM, such as the NVM 110 of FIG. 1, is recorded in a second L2P table as LBAs in a volatile memory unit, such as the volatile memory unit 112. The volatile memory unit 112 may be a DRAM unit. Furthermore, the NVM 110 may include a first L2P table that matches the first L2P table of the volatile memory unit 112 and a second L2P table that matches the second L2P table of the volatile memory unit 112. The L2P tables in the NVM 110 are updated to match the L2P tables of the volatile memory unit 112.

The L2P tables include pointers that point to each physical location of the data within the NVM 110. The physical location of the data is mapped in a logical array, such that the pointer address array comprises the location mapped from die to NAND location. In a block, the total number of pointers is calculated as follows: 256 WL*3 Pages/WL*4 Slots/Page*1 pointer/slot=3,072 pointers. Within a first zone at capacity comprising 62 blocks, 190,464 pointers may exist (i.e., 3,072 pointers/block*62 blocks=190,464 pointers). Each pointer comprises a certain amount of data that utilizes the available storage of the volatile memory 112 and/or the NVM 110.

Figure 6:
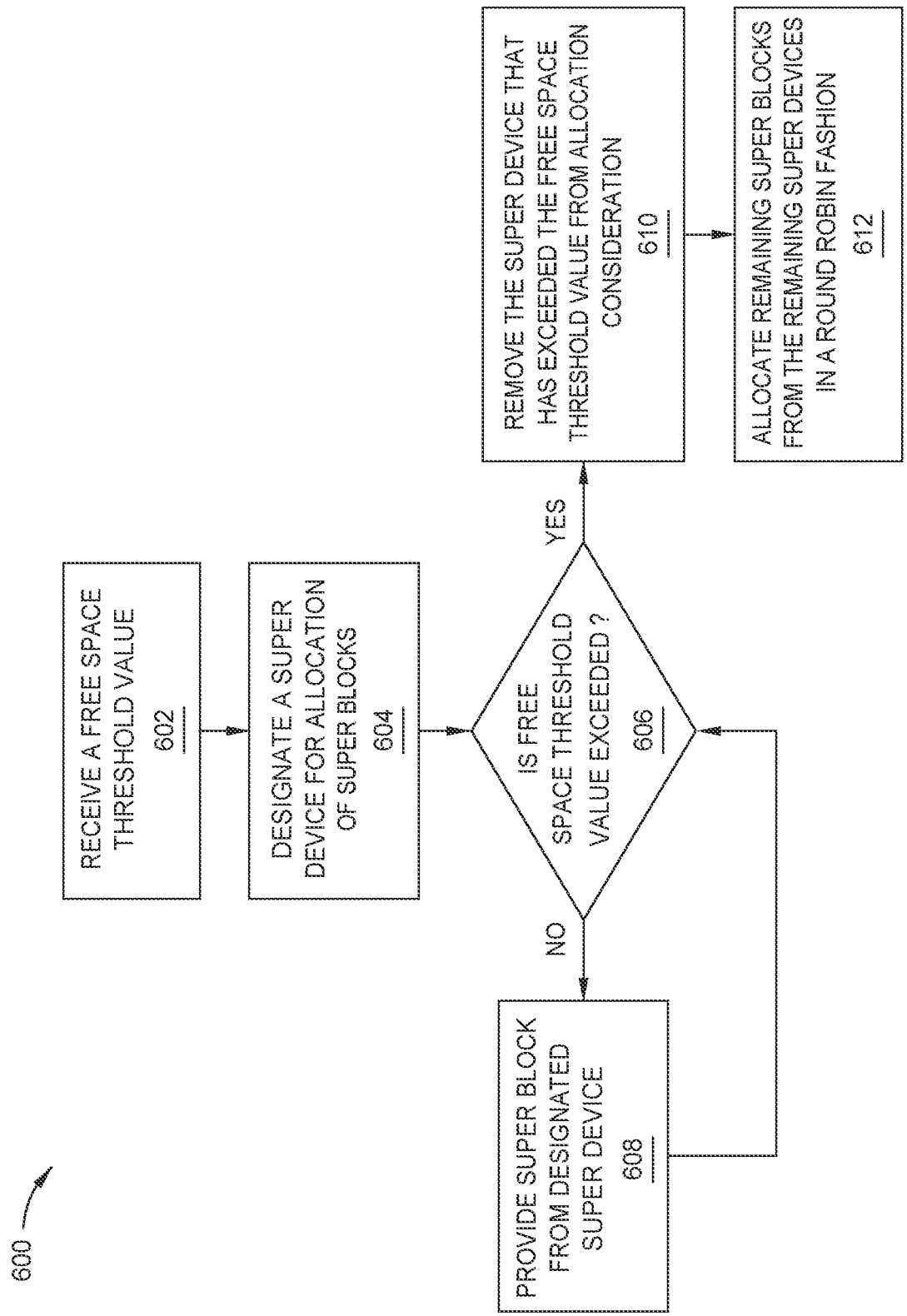
FIG. 6 is a flow diagram illustrating a method of creating a controlled imbalance while allocating super blocks to a super device, according to certain embodiments.

FIG. 6 is a flow diagram illustrating a method 600 of creating a controlled imbalance while allocating super blocks, such as a first SB 356a of FIG. 3B, to a super device, such as a first SD0 402a of FIG. 4, according to certain embodiments. Method 600 may be executed by a controller, such as a controller 108 of FIG. 1, or a FAM, such as the FAM 150 of FIG. 1. Aspects of the storage system 100 of FIG. 1 may be referenced for exemplary purposes. For exemplary purposes, a SB stores the data of a single zone, such that the SB capacity and the zone capacity are equal. However, an SB may store the data of one or more zones in other embodiments.

At block 602, the controller 108 receives a free space threshold value, such as the free space threshold value 404 of FIG. 4. The free space threshold value 404 may be preset during data storage device 106 initiation, such as during a power up sequence, or set by the host device 104 through a command or request sent to the controller 108. At block 604, the controller 108 designates a super device, such as first SD0 402a, for allocation of super blocks, such as first SB 356a. At block 606, the FAM 150 determines if the designated SD has exceeded the free space threshold value 404. If free space threshold value 404 is not exceeded, then the designated SD provides an SB to be allocated to a zone at block 608 and returns to block 606 to have its free space evaluated further. However, if the free space threshold value 404 is exceeded at block 606, then at block 610, the SD that has exceeded the free space threshold value 404 is removed from allocation consideration. The removing of an SD from allocation consideration allows the controller 108 or the FAM 150 to maintain a minimum amount of free space in the SD or, rather, in each SD. Free space threshold value 404 evaluation at block 606 may occur one time or may occur several times. After the designated SD is removed from consideration, the remaining SBs are allocated from the remaining SDs in a round robin fashion.

Figure 7:
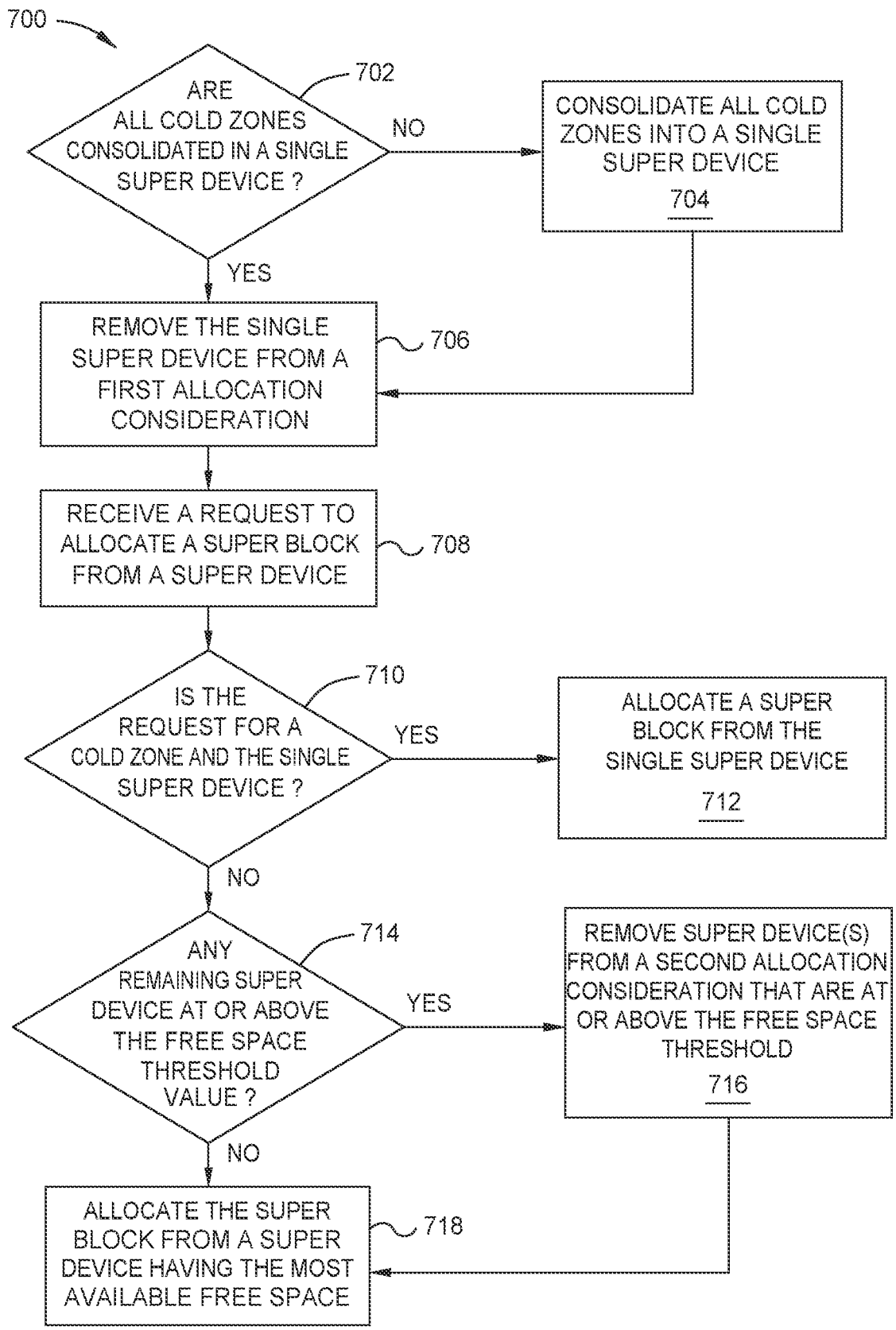
FIG. 7 is a flow diagram illustrating a method of creating a controlled imbalance while allocating super blocks to a super device, according to certain embodiments.

FIG. 7 is a flow diagram illustrating a method 700 of creating a controlled imbalance while allocating super blocks, such as a first SB 356a of FIG. 3B, to a super device, such as a first SD0 402a of FIG. 4, according to certain embodiments. Method 700 may be executed by a controller, such as a controller 108 of FIG. 1, or a FAM, such as the FAM 150 of FIG. 1. Aspects of the storage system 100 of FIG. 1 may be referenced for exemplary purposes. For exemplary purposes, a SB stores the data of a single zone, such that the SB capacity and the zone capacity are equal. However, an SB may store the data of one or more zones in other embodiments.

At block 702, the FAM 150 determines if all cold zones are consolidated in a single SD. If not all of the cold zones are consolidated in a single SD, then, at block 704, all of the cold zones are consolidated into a single SD. The consolidating of cold zones in a single SD may include copying the data from the one or more cold zones of the other SDs and programming the copied data to the single SD. The data of the one or more cold zones of the other SDs are then reset, such that storage space is recovered and additional data may be stored to the other SDs. At block 706, the single SD corresponding to the cold zone storage is removed from allocation consideration. However, if all cold zones are consolidated into a single SD, the FAM 150 goes to block 706 and removes a single SD from allocation consideration.

At block 708, a request to allocate an SB from an SD is received by the FAM 150. At block 710, the FAM 150 or the controller 108 determines if the request is for both a cold zone and the single SD storing the cold zones. If the request is for both a cold zone and the single SD, then the FAM 150 allocates a SB from the single SD at block 712. However, if the request is not for a cold zone and the single SD, then at block 714, the FAM 150 evaluates whether there are any remaining SDs at or above the free space threshold value.

If there are other remaining SDs at or above the free space threshold, then at block 716, the SD(s) that are at or above the free space threshold are removed from a second allocation consideration. It is to be understood that the FAM 150 or the controller 108 may include more than one allocation consideration. For example, the first allocation consideration may be applicable to one or more SDs storing a certain data type, such as cold zones, and the second allocation consideration may be applicable to the other one or more SDs. The removing of an SD from allocation consideration allows the controller 108 or the FAM 150 to maintain a minimum amount of free space in the SD or rather, in each SD. At block 718, the SB is allocated from the SD having the most available free space.

Figure 8:
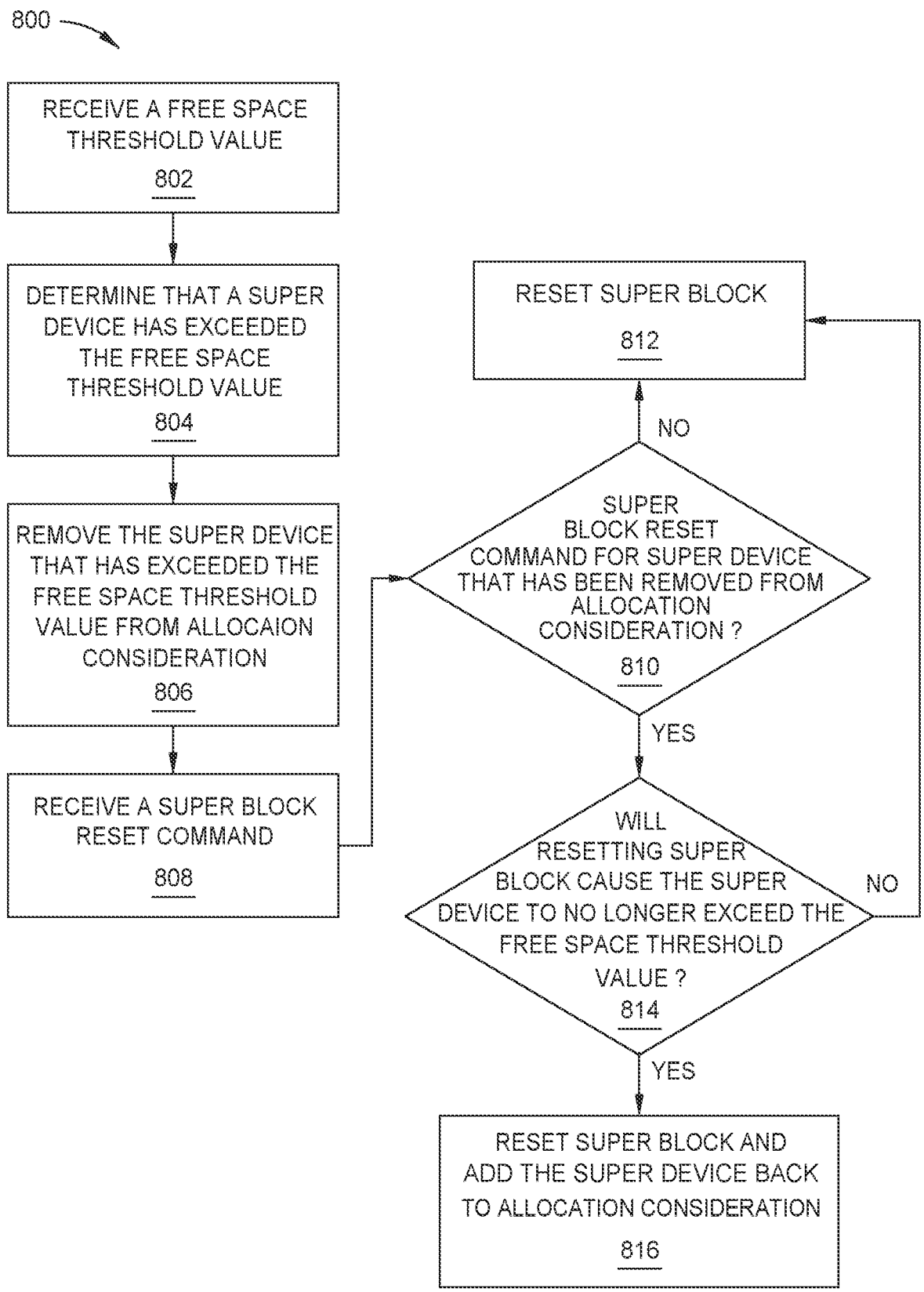
FIG. 8 is a flow diagram illustrating a method of adding a super device back to allocation consideration, according to certain embodiments.

FIG. 8 is a flow diagram illustrating a method 800 of adding a super device, such as a first SD0 402a of FIG. 4, back to allocation consideration, according to certain embodiments. Method 800 may be executed by a controller, such as the controller 108 of FIG. 1, or a FAM, such as the FAM 150 of FIG. 1. Aspects of the storage system 100 of FIG. 1 may be referenced for exemplary purposes. For exemplary purposes, a SB stores the data of a single zone, such that the SB capacity and the zone capacity are equal. However, a SB may store the data of one or more zones in other embodiments.

At block 802, the controller 108 receives a free space threshold value, such as the free space threshold value 404 of FIG. 4. The free space threshold value 404 may be preset during data storage device 106 initiation, such as during a power up sequence, or set by the host device 104 through a command or request sent to the controller 108. At block 804, the FAM 150 determines that an SD has exceeded the free space threshold value 404. Because the SD has exceeded the free space threshold value 404, the FAM 150 removes the SD from allocation consideration at block 806. The removing of an SD from allocation consideration allows the controller 108 or the FAM 150 to maintain a minimum amount of free space in the SD or rather, in each SD.

At block 808, the controller 108 receives a SB reset command for a SB of an SD. The SB reset command may be a zone reset request, where the data of the zone is unmapped, erased, or temporarily removed as part of a data management operation, such as garbage collection. At block 810, the FAM 150 determines if the SB reset command for a SB of an SD is for an SD that has been removed from allocation consideration. For example, the SD may be the SD removed from allocation consideration at block 608 of FIG. 6. If the SB reset command is not for an SD that has been removed from allocation consideration, then the relevant SB is reset at block 812.

However, if the SB reset command is for an SD that has been removed from allocation consideration, then the FAM 150 or the controller 108 determines if resetting the SB will cause the SD to no longer exceed the free space threshold value at block 814. If resetting the SB will not cause the SD to no longer exceed the free space threshold value at block 812, then the SB is reset at block 812 and the SD is still removed from allocation consideration. However, if the relevant SB is reset and the controller 108 or the FAM 150 determines that the SD is no longer exceeding the free space threshold value, then the relevant SD is added back to allocation consideration at block 816.

By purposefully creating an imbalance with the super block allocation across a plurality of super devices, the write performance and efficiency of the data storage device may be improved.

In one embodiment, a data storage device includes a memory device having a plurality of super devices and a controller coupled to the memory device. The controller is configured to set a free space threshold value for amount of free space that each super device of the plurality of super devices can have, determine that at least one super device of the plurality of super devices is at or above the free space threshold determine that cold zones are disposed in more than one super device of the plurality of super devices, move data from the cold zones to a first super device of the plurality of super devices, wherein after moving the data, all super devices are below the free space threshold, and allocate all new super blocks among the plurality of super devices without allocating any new super blocks to the first super device.

Each new super block comprises at least one zone of a zone namespace (ZNS). The allocating comprises evenly distributing all new super blocks. The allocating comprises distributing new super blocks round robin. The allocating comprises distributing a first super block of the new super blocks to a super device having a greatest amount of free space. The allocating further comprises distributing new super blocks one at a time, and wherein the distributing occurs to a super block that has a greatest amount of free space. The allocating further comprises randomly distributing the new super blocks. The allocating further comprises unevenly distributing the new super blocks.

In another embodiment, a data storage device includes a memory device having a plurality of super devices and a controller coupled to the memory device. The controller is configured to relocate all data from all cold zones from the plurality of super devices into a first super device of the plurality of super devices, and allocate super blocks to super devices of the plurality of super devices based upon amount of available free space, wherein the super blocks are allocated round robin, and wherein the super blocks are not allocated to the first super device.

At least one super device has a super block prior to allocating, and wherein the at least one super block contains a plurality of zones. The plurality of zones comprises one or more cold zones, one or more hot zones, or combinations thereof. A zone is classified as hot or cold depending upon a zone reset count. A zone is a hot zone if the zone reset count is greater than a zone reset threshold, and wherein a zone is a cold zone if the zone reset count is less than the zone reset threshold. Data is written sequentially to the zones disposed in the super blocks. The controller is configured to remap the relocated data. The relocating all data occurs as a background operation.

In another embodiment, a data storage device includes memory means including a plurality of super devices and a controller coupled to the memory means. The controller is configured to determine that cold zones are dispersed across the plurality of super devices, consolidate data of the cold zones into a first super device of the plurality of super devices, determine that a second super device of the plurality of super devices is at or above a free space threshold, and evenly allocate super blocks to other super devices of the plurality of super devices, wherein the super blocks are not allocated to the first super device or the second super device.

The controller is configured to ensure an even distribution of hot zones across the plurality of super devices other than the first super device and the second super device. The controller is configured to ensure a substantially even distribution of free space zones across the plurality of super devices other than the first super device and the second super device. The controller is configured to consolidate data to ensure more cold zones are concentrated in first super device of the plurality of super devices, wherein a cold zone is a zone that is overwritten less than a hot zone.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device comprising a plurality of super devices; and
a controller coupled to the memory device, wherein the controller is configured to:
set a free space threshold value for an amount of free space that each super device of the plurality of super devices can have;
determine that at least one super device of the plurality of super devices is at or above the free space threshold;
determine that a plurality of cold zones are disposed in more than one super device of the plurality of super devices, wherein a zone is classified as a cold zone based on determining that a zone reset count of the zone is less than or equal to a zone reset threshold, and wherein the zone is classified as a hot zone based on determining that the zone reset count of the zone is greater than the zone reset threshold;

move data from the plurality of cold zones to a first super device of the plurality of super devices, wherein after moving the data, all super devices are below the free space threshold, wherein the controller is configured to move the data from the plurality of cold zones to ensure that a greater number of cold zones are concentrated in the first super device of the plurality of super devices than in other super devices of the plurality of super devices, and wherein the cold zone is a zone that is overwritten less than the hot zone; and allocate all new super blocks among the plurality of super devices without allocating any new super blocks to the first super device.

2. The data storage device of claim 1, wherein each new super block comprises at least one zone of a zone namespace (ZNS).

3. The data storage device of claim 1, wherein the allocating comprises evenly distributing all new super blocks.

4. The data storage device of claim 1, wherein allocating comprises distributing new super blocks round robin.

5. The data storage device of claim 1, wherein allocating comprises distributing a first super block of the new super blocks to a super device having a greatest amount of free space.

6. The data storage device of claim 1, wherein allocating further comprises distributing new super blocks one at a time, and wherein the distributing occurs to a super block that has a greatest amount of free space.

7. The data storage device of claim 1, wherein allocating further comprises randomly distributing the new super blocks.

8. The data storage device of claim 1, wherein allocating further comprises unevenly distributing the new super blocks.

9. A data storage device, comprising:
a memory device, the memory device having a plurality of super devices; and
a controller coupled to the memory device, the controller configured to:
relocate all data from all of a plurality of cold zones from the plurality of super devices into a first super device of the plurality of super devices, wherein a zone is classified as a cold zone based on determining that a zone reset count of the zone is less than or equal to a zone reset threshold, wherein the zone is classified as a hot zone based on determining that the zone reset count of the zone is greater than the zone reset threshold, wherein the controller is configured to relocate all the data from all of the plurality of cold zones to ensure that a greater number of cold zones are concentrated in the first super device of the plurality of super devices than in other super devices of the plurality of super devices, and wherein the cold zone is a zone that is overwritten less than the hot zone; and allocate super blocks to super devices of the plurality of super devices based upon amount of available free space, wherein the super blocks are allocated round robin, and wherein the super blocks are not allocated to the first super device.

10. The data storage device of claim 9, wherein at least one super device has a super block prior to allocating, and wherein the at least one super block contains a plurality of zones.

11. The data storage device of claim 10, wherein the plurality of zones comprises one or more cold zones, one or more hot zones, or combinations thereof.

12. The data storage device of claim 9, wherein data is written sequentially to the zones disposed in the super blocks.

13. The data storage device of claim 9, wherein the controller is configured to remap the relocated data.

14. The data storage device of claim 9, wherein the relocating all data occurs as a background operation.

15. A data storage device, comprising:
memory means comprising a plurality of super devices; and
a controller coupled to the memory means, the controller configured to:
determine that a plurality of cold zones are dispersed across the plurality of super devices, wherein a zone is classified as a cold zone based on determining that a zone reset count of the zone is less than or equal to a zone reset threshold, and wherein the zone is classified as a hot zone based on determining that the zone reset count of the zone is greater than the zone reset threshold;
consolidate data of the plurality of cold zones into a first super device of the plurality of super devices, wherein the controller is configured to consolidate data to ensure that a greater number of cold zones are concentrated in the first super device of the plurality of super devices than in other super devices of the plurality of super devices, wherein the cold zone is a zone that is overwritten less than the hot zone;
determine that a second super device of the plurality of super devices is at or above a free space threshold; and
evenly allocate super blocks to other super devices of the plurality of super devices, wherein the super blocks are not allocated to the first super device or the second super device.

16. The data storage device of claim 15, wherein the controller is configured to ensure an even distribution of hot zones across the plurality of super devices other than the first super device and the second super device.

17. The data storage device of claim 15, wherein the controller is configured to ensure a substantially even distribution of free space zones across the plurality of super devices other than the first super device and the second super device.

* * * * *